United States Patent [19]
Morris et al.

[11] Patent Number: 5,869,118
[45] Date of Patent: Feb. 9, 1999

[54] GELLAN GUM TO IMPROVE PHYSICAL STABILITY OF LIQUID NUTRITIONAL PRODUCTS

[75] Inventors: Jeffrey G. Morris, Columbus; Normanella T. Dewille, Upper Arlington; Gregory A. Snowden, Westerville; Michael A. Chandler, Gahanna; Amanda L. Gunn, Washington Court House; Rohini P. Mulchandani, Worthington; Steven L. Hartline, Westerville, all of Ohio

[73] Assignee: Abbott Laboratories, Abbott Park, Ill.

[21] Appl. No.: 748,315

[22] Filed: Nov. 13, 1996

[51] Int. Cl.[6] ............... A23L 1/05; A23L 1/275; A01N 43/04; A23C 21/10
[52] U.S. Cl. ............ 426/72; 426/74; 426/330.3; 426/573; 426/590; 426/593; 426/598; 426/584; 426/800; 426/648
[58] Field of Search .................. 426/590, 593, 426/598, 72, 73, 573, 330.3, 584, 800, 74, 569, 648; 424/488, 439

[56] References Cited

U.S. PATENT DOCUMENTS

| | | | |
|---|---|---|---|
| 3,619,205 | 11/1971 | Le Van | 99/78 |
| 3,736,149 | 5/1973 | Knapp | 99/78 |
| 4,326,052 | 4/1982 | Kang et al. | 536/1 |
| 4,326,053 | 4/1982 | Kang et al. | 536/1 |
| 4,503,084 | 3/1985 | Baird et al. | 426/573 |
| 4,980,193 | 12/1990 | Tuason, Jr. et al. | 426/654 |
| 5,104,677 | 4/1992 | Behr et al. | 426/590 |
| 5,190,778 | 3/1993 | Clare et al. | 426/329 |
| 5,196,220 | 3/1993 | Clare et al. | 426/329 |
| 5,223,285 | 6/1993 | De Michael et al. | 426/72 |
| 5,306,519 | 4/1994 | Peterson et al. | 426/658 |
| 5,322,702 | 6/1994 | Selinger et al. | 426/583 |
| 5,338,561 | 8/1994 | Campbell et al. | 426/602 |
| 5,376,396 | 12/1994 | Clark | 426/573 |
| 5,403,826 | 4/1995 | Cope et al. | 514/21 |
| 5,416,077 | 5/1995 | Hwang et al. | 514/54 |
| 5,456,937 | 10/1995 | Chalupa | 426/573 |
| 5,503,863 | 4/1996 | Brain et al. | 426/573 |
| 5,514,655 | 5/1996 | DeWille et al. | 514/21 |
| 5,516,543 | 5/1996 | Amankonah et al. | 426/573 |
| 5,545,410 | 8/1996 | Fox et al. | 424/439 |
| 5,562,939 | 10/1996 | Lewis | 426/250 |
| 5,589,468 | 12/1996 | Lin et al. | 514/52 |
| 5,597,595 | 1/1997 | DeWille et al. | 426/74 |
| 5,597,604 | 1/1997 | Chalupa et al. | 426/590 |
| 5,609,897 | 3/1997 | Chandler et al. | 426/73 |
| 5,616,358 | 4/1997 | Taylor et al. | 426/590 |
| 5,641,531 | 6/1997 | Liebrecht et al. | 426/583 |
| 5,641,532 | 6/1997 | Pflaumer et al. | 426/590 |
| 5,654,027 | 8/1997 | Chalupa | 426/573 |
| 5,698,222 | 12/1997 | Mazer et al. | 424/464 |

FOREIGN PATENT DOCUMENTS

| | | |
|---|---|---|
| 458 613 | 11/1991 | European Pat. Off. . |
| 460 830 | 12/1991 | European Pat. Off. . |
| 648 495 | 4/1995 | European Pat. Off. . |
| WO 94 24887 | 11/1994 | WIPO . |
| WO 96 00018 | 1/1996 | WIPO . |
| WO 96 19925 | 7/1996 | WIPO . |

*Primary Examiner*—Cynthia L. Nessler
*Attorney, Agent, or Firm*—Thomas D. Brianard; J. Michael Dixon

[57] ABSTRACT

Liquid, nutritionally complete formulas are disclosed with improved physical stability. The nutritionally complete formulas are pourable, yet are able to hold minerals, insoluble fiber and flavoring agents such as cocoa powder in suspension without the formation of a sediment that is not readily redispersible. The invention comprises the use of gellan gum at a concentration of between 10–500 parts per million. Although gellan gum alone is sufficient, the nutritionally complete formula may also comprise other stabilizers such as carrageenan and/or carboxymethylcellulose.

21 Claims, No Drawings

5,869,118

GELLAN GUM TO IMPROVE PHYSICAL STABILITY OF LIQUID NUTRITIONAL PRODUCTS

TECHNICAL FIELD

The present invention relates to liquid formulas and more particularly to liquid formulas that are nutritionally complete and which have improved physical stability.

BACKGROUND OF THE INVENTION

The liquid nutritional industry is a multi-billion dollar a year business. Infant formulas and medical nutritionals comprise the major portion of this industry. "Nutritionally complete" formulas such as infant formulas and medical nutritionals, are required to contain significant levels of minerals, vitamins, protein, carbohydrates and fat to provide the required level of these nutrients to a human in an acceptable volume. These nutritionally complete formulas allow for the formula to be the sole source of nutrition for a human consuming same. The presence of certain minerals, such as calcium and phosphorus, is vitally important to the efficacy of the nutritional. However, the presence of these high levels of minerals, protein and fat cause a number of significant problems in the manufacture and use of these formulas.

Nutritionally complete liquid formulas have traditionally been plagued with the problems of creaming and sedimentation. Creaming occurs when fat globules in the liquid nutritional float to the top of the product. These fat globules can harden and block or clog feeding tubes or nipples. In sedimentation, various insoluble components of the liquid nutritional settle to the bottom of the product container. Of particular concern is the sedimentation of calcium, phosphorous, fibers and flavoring powders, such as cocoa. Cocoa powder is especially prone to sedimentation and when cocoa powder sediments, it is not easily redispersed. The sedimentation of these elements is further aggravated when the sediment hardens into a cementous type of material known as "non-dispersible sediment". The problem with non-dispersible sediment is three fold: (1) the liquid nutritional is now subject to nutrient deficiency, since the non-dispersible sediment often refuses to go back into solution upon the shaking of the container; (2) the sediment will plug feeding tubes or nipples; and (3) the product appearance is negatively affected, for example, the product appears "spoiled" to the consumer.

The liquid nutritional industry, in the past, has focused on reducing sedimentation through the use of stabilizers such as carrageenans and celluloses. While the formation of non-dispersible sediment is delayed through the use of the prior art stabilizer systems, it has not been prevented. One feature of the present invention resides in the discovery that gellan gum, while not preventing sedimentation, allows for the redispersion of the sediment upon shaking without creating a significant amount of non-dispersible sediment.

Numerous stabilizing systems have been proposed to address the sediment and creaming problems in a nutritionally complete formula. These solutions however, resulted in limited success. Stabilizing systems known to date allow the minerals, fibers and flavoring powders to be suspended longer, however, they ultimately fall from solution. Typically, stabilizing systems or suspenders of insolubles are locust bean gum, guar gum, carboxymethylcellulose, lambda carrageenan, konjac flour and the like. These stabilizers are known as "non-gelling" or "weakly gelling" types. These stabilizers require fairly high addition rates (1200 ppm and higher) and high resulting viscosities (above 50+ cps or 0.05 Pa·s) to achieve acceptable levels of suspension.

The problems associated with physical stability of nutritionally complete liquid formulas have been addressed through the micronization of the salts or minerals which are added to the liquid nutritional. Micronization is the comminuting of the salts and/or minerals to a particle size of about one $\mu$m ($10^{-6}$ meter or "micron") or less. It is believed that the reduced particle size of the salts and/or minerals will lessen their sedimentation. This approach is costly and any sedimentation which occurs is typically not able to be re-dispersed by shaking the container.

The use of a stabilizer such as carrageenan, carboxymethylcellulose and guar gums is well known in connection with solid food products. It must be appreciated that sedimentation and creaming are not nearly as much a problem in solid foods as they are in liquid nutritionals. In addition, the use of carrageenans and/or other hydrocolloids impacts the desired viscosity and flow characteristics of the liquid nutritional.

Viscosity of a liquid enteral nutritional under various levels of shear stress is a very important characteristic. High viscosity products (those over 0.05 Pa·s or 50 cps) under high levels of shear stress, are not useful for tube feeding or through a nipple. As used herein and in the claims, the term "low viscosity" means a liquid nutritional product with a viscosity of less than about 0.05 Pa·s (50 cps) as measured by a Brookfield Viscometer using a #1 spindle at room temperature and at 60 rpm. Also important is the aspect of "yield stress". Yield stress means that upon the application of shear (force measured in dynes/cm$^2$), the product will flow in a manner that is acceptable for tube or nipple feeding. An aspect of the present invention is directed to the discovery that 10 to 500 ppm of gellan gum provides reduced sedimentation while maintaining actual yield stress values in the range of 0.1 to 1.0 dynes/cm$^2$. The term "actual yield stress" means values that are measured directly and not derived from a mathematical model.

U.S. Pat. No. 5,416,077 to Hwang et al. discloses a liquid nutritional composition containing from 50 to 1,000 parts per million of iota-carrageenan and optionally, kappa-carrageenan. This patent fails to disclose or suggest the use of gellan gums and the unexpected results that can be realized through the use of gellan gum in nutritionally complete liquid foods.

WO 94/24887 to Clark discloses a beverage stabilizing system which is a blend of gellan gum and carboxymethylcellulose. This application discloses that the gellan gum/carboxymethylcellulose system provides a weak, stabilizing gel structure suitable for beverage products. This application, which discloses stabilized chocolate milks and fruit juices, requires the combined use of gellan gum and a carboxymethylcellulose (CMC). Further it is stated that gellan gum alone does not provide enough structure to prevent settling. The beverage stabilizing blend of CMC and gellan gum, is disclosed as being in a weight ratio of between about 3:1 to 20:1.

European Patent Application 045437382 to Colegrove discloses the use of gellan gum fibers, produced by extrusion into a gelling salt bath, as wound dressings and catamenial devices. It is further disclosed that other gums may be coextruded with the gellan gum to produce useful fibers.

U.S. Pat. Nos. 5,190,778 and 5,196,220 to Clare et al. discloses fermented malt beverages (beers) having improved foam stability and desirable lace, cling and clarity. It is disclosed that the beverage is stabilized by adding 5 to 400 ppm by weight of gellan gum. These patents do not suggest or disclose the use of gellan gums to overcome the problems associated with the sedimentation of calcium, phosphorous, insoluble fibers and flavoring powders, such as cocoa, in nutritionally complete liquid formulas.

An article entitled "Mechanical Properties of Gellan Gels in Relation to Divalent Cations" by Tang et al. *Journal of Food Science,* Vol. 60, No. 4, (1995) discusses the mechanical properties of gellan gels containing different polymer and cation concentrations. The article states that at a given concentration of gellan gum, the gels were extensible below the critical cation level and brittle above that level. This reference fails to suggest or disclose a solution to the unique problems associated with stabilizing nutritionally complete liquid formulas or that such formulas would benefit from the inclusion of from 10 to 500 parts per million (ppm) of gellan gum.

Hannigan in *Food-Engineering,* 55(1), pages 52–53 discusses gellan gum which is produced by controlled fermentation of *Pseudomonas elodea* and deacetylation. Gellan gum is disclosed as requiring a cation, preferably calcium, for gelation. Gellan gum is suggested as a replacement for several different commercially used gelling agents utilized in the manufacture of foods. Recited applications include jellies, deserts, retorted and ultra high temperature (UHT) processed solid foods, beverages and milk products (ice cream, cheese, yogurt and the like).

Gellan gums are sold by the Kelco Division of Merck & Co. under the KelcoGel® brand name. Gellan gums are known as multi-functional gelling agents for use in foods, pet foods, personal care products and industrial applications. Gellan gums have been approved by the U.S. Food & Drug Administration for use in foods and have been developed specifically for bakery fillings, confections, icings, frostings, glazes, jams, jellies, puddings and personal care products.

Gellan gum is a high molecular weight extracellular heteropolysaccharide produced by fermentation of a culture of *Pseudomonas elodea,* ATCC 31461. During fermentation, oxygen, temperature and pH are strictly controlled. When the fermentation is complete, the gellan gum is isolated from the broth by alcohol extraction and dried. It is known that gellan gums form gels with a wide variety of cations, notably calcium (Ca 2+), magnesium (Mg 2+), sodium (Na+), potassium (K+) and also hydrogen ions (H+) from acid. These cations cause the gellan molecules to associate and form a gel. Calcium and magnesium are known to be much more efficient gel formers than sodium or potassium.

Historically, carrageenans have been used to suspend calcium and phosphorous and reduce sedimentation and the compaction of the sediment. Products containing high levels of calcium, phosphorous, dietary fiber and other insoluble agents, such as cocoa powder, are especially susceptible to sedimentation, and the conventional stabilizing systems leave much to be desired. Further, the use of carrageenans has been identified as a bowel irritant to people consuming products that contain high levels of this stabilizer and certain countries around the world do not permit the use of carrageenans in food products.

Thus, a need exists to improve the physical stability of nutritionally complete, low viscosity formulas while reducing or eliminating the use of carrageenans. While the liquid nutritionals of this invention are particularly suited for infant formulas and medical nutritionals, it is contemplated herein that the invention would also be useful for any liquid nutritional that has encountered the problems of sedimentation.

DISCLOSURE OF THE INVENTION

An ideal stabilizer for nutritionally complete liquid formula would exhibit at least the following rheological profile: (1) behave like a gel with high viscosity under quiescent conditions, so as to suspend insoluble materials such as calcium during storage; (2) "flow like water" when poured or tube fed (high degree of pseudoplasticity); and (3) when left undisturbed after shaking, reform a gel to as near the original characteristic as possible. This invention discloses a novel stabilizer for nutritionally complete formula that demonstrates these rheological attributes.

There is disclosed a nutritionally complete liquid formula with improved physical stability, said liquid formula comprising gellan gum at a concentration between 10 and 500 parts per million, said concentration being low enough for said liquid formula to possess an actual yield stress value of from about 0.1 to about 1.0 dyne/cm$^2$, yet said concentration being high enough to hold minerals, fibers and flavoring agents, such as cocoa powder, in suspension with minimum sedimentation.

As used herein and in the claims, the term "parts per million" or "ppm" is based on weight.

There is also disclosed a liquid nutritional composition comprising a liquid nutritional mixture containing a total solids content including suspended minerals at a concentration of from about 5% to about 35% by weight. As mentioned previously, liquid nutritionals are unique in that as a sole source of nutrition, they must supply all of the required dietary minerals to the consuming patients. Nutritionally complete formulas may contain from 5 to 35% by weight total solids including suspended minerals (i.e., calcium phosphorous and the like), more specifically 10 to 30% by weight total solids including suspended minerals, and even more specifically 15 to 25% by weight total solids including suspended dietary minerals. It is this high loading of minerals, in part, that causes the problem of sedimentation that these products experience.

In another embodiment, the invention comprises carboxymethylcellulose, carrageenan and gellan gum as a stabilizer system for the nutritionally complete liquid formula wherein the concentration of the gellan gum is less than 5% by weight of the total concentration of the stabilizing system (gellan gum plus carrageenan plus carboxymethylcellulose).

There is also disclosed a liquid, nutritionally complete food with reduced sedimentation, said liquid food comprising gellan gum and carrageenan in a weight ratio of gellan gum to carrageenan of at least 1:4, said gellan gum being of a concentration between 10 and 500 parts per million and said liquid food having a viscosity of less than 0.05 Pa·s (50 cp). In a more preferred embodiment, the weigh ratio of gellan gum to carrageenan is at least 1:5 and the viscosity is less than 0.04 Pa·s (40 cp).

Preferably, the liquid nutritional in accordance with this invention uses only gellan gum as the stabilizer. The gellan gum is preferably at a concentration between 10 and 500 parts per million, more preferably between 20 and 400 parts per million and most preferably between 50 and 100 ppm.

There is also disclosed a liquid nutritional composition comprising a liquid nutritional mixture containing suspended minerals and having a total solid content, including suspended minerals, in the range from about 5 to about 35% by weight and a stabilizing system consisting of gellan gum that is present in the liquid nutritional composition at a concentration in the range of 10 to 500 parts per million.

There is also disclosed a method of preparing a liquid nutritional composition comprising the steps of: (a) preparing a liquid nutritional mixture comprising: (i) suspended minerals and wherein said nutritional mixture contains total solids, including suspended minerals, in the range from about 10% to about 35% by weight; and (ii) gellan gum; (b) subjecting the mixture to aseptic processing; and (c) aseptically packaging the liquid nutritional composition so that the composition is essentially devoid of sedimentation.

There is further disclosed a liquid nutritional comprising (a) a protein system consisting of, by weight, about 50 to 90% of a protein hydrolysate and not more than about 50% of one or more intact proteins; (b) a fat source; (c) a carbohydrate system; and (4) a stabilizer system comprising gellan gum at a concentration of from 175 to 350 ppm.

There is also disclosed a process for the incorporation of gellan gum into a nutritionally complete liquid formula comprising the steps of (a) forming a dispersion of (i) gellan gums in water; or (ii) gellan gum and sugar in water; (b) admixing a sequesterant to the dispersion formed in step (a) to form a solution; and (c) admixing additional components to form a nutritionally complete liquid formula.

There is still further disclosed a liquid nutritional composition wherein the composition has a caloric content in the range from about 500 calories per liter to about 2000 calories per liter and wherein the liquid nutritional composition has a caloric distribution of about 10 to 20% protein, 25 to 40% fat and 40 to 60% carbohydrate.

Another aspect of the invention provides for a nutritionally complete liquid formula possessing an actual yield stress (the stress above which flow begins) of approximately 0.1 to 1.0 dyne per square cm. Yield stress refers to a minimum shear stress or force that must be applied to a quiescent fluid to initiate flow deformation. One aspect of the present invention relates to the discovery that use of gellan gum produces nutritionally complete liquid formulas having a yield stress. As used herein and in the claims, the term "actual yield stress" means the yield stress of a quiescent sample as measured by physical measurements and not a yield stress that is derived from a mathematical model. The advantage of having a yield stress is that the nutritional product will not move (flow) until a force is applied. Thus, minerals will not sediment or fall due to the gel structure, however, once force is applied to the product (through pouring, shaking or pumping), the gel structure easily breaks and thus provides for a free flowing liquid. Examples of materials having a yield stress are ketchup, mustard, toothpaste, mayonnaise and various polymer solutions. One aspect of the invention resides in a nutritionally complete liquid formula which is shear thinning, such that the product is freely flowing at shear rates at which the product is poured or consumed. It is believed that a weak three-dimensional network forms through interaction of the gellan gum and the components of the liquid nutritional. This network maintains product emulsion and suspension stability.

There is disclosed a nutritionally complete liquid formula with improved physical stability containing at least one material selected from the group comprising dietary fibers, soy polysaccharides and cocoa powder. This liquid formula contains a stabilizing system which comprises gellan gum at a concentration between 175 and 350 parts per million and wherein the concentration is low enough for the liquid formula to possess a yield stress of about 0.1 to about 1.0 dyne per square centimeter.

There is also disclosed a method for the reduction of sedimentation in a nutritionally complete liquid formula. This method comprises the steps of (1) hydrating gellan gum in a buffered system; (2) combining the hydrated gellan gum with a slurry selected from a protein slurry, a carbohydrate slurry, a fat slurry and mixtures thereof, to form a gellan gum slurry; and (3) combining the gellan gum slurry with one or more slurries and/or premixes to result in a nutritionally complete liquid formula containing total solids in the range from about 10% to about 35% by weight and wherein the nutritionally complete liquid formula has a yield stress of about 0.1 to about 1.0 dyne per square centimeter.

The nutritional industry has expended a substantial effort to solve the problems uniquely encountered with medical and infant nutritional products. The problems encountered by these nutritionally complete liquid formulas are unique. Other foods such as yogurt, are not required to deliver all or a substantial portion of the vitamins, minerals, fats and proteins required for the average human. Thus, a solution to the problems of sedimentation and creaming would fulfill a long-felt need in this very specific industry.

Other aspects and advantages of the present invention will become apparent from the following description, examples and the appended claims.

DETAILED DESCRIPTION OF THE INVENTION

The primary structure of gellan gum consists of a linear tetrasaccharide repeat structure. Each repeating unit comprising four (4) sugar units of 1,3-$\beta$-D-glucose; 1, 4-$\beta$-D-glucuronic acid; 1,4-$\beta$-D-glucose and 1,4-$\alpha$-L-rhamnose. The molecular weight of gellan gums can range from about $4 \times 10^5$ to about $6 \times 10^5$ daltons. These gums are supplied as free-flowing powders containing about 10 to 15% water by weight.

The term "gellan gum" as used herein and in the claims, means a high molecular weight extracellular heteropolysaccharide produced by fermentation of the organism *Pseudomonas elodea*. When fermentation of *Pseudomonas elodea* is complete, the viscous broth is pasteurized to kill viable cells prior to recovery of the gum. Direct recovery from the broth yields the gum in its native or high acyl form. Recovery after deacylation by treatment with alkali, produces the gum in its low acyl form. The acyl groups are known to influence gel characteristics.

Three (3) forms of gellan gums are presently available from the Kelco Division of Merck & Co., San Diego, Calif. The first form is K9A50 which is a non-clarified form of gellan gum for industrial use. The second form is Kelco-Gel® gellan gums for food and industrial products. The third form is Gelrite® gellan gums for microbial media, plant tissue culture and pharmaceutical applications. In a preferred embodiment of the invention, the KelcoGel® form of gellan gum is marketed under the names: KelcoGel®, KelcoGel F®, KelcoGel BF.BF-10®, KelcoGel JJ®, KelcoGel IF®, and KelcoGel CF.CF-10®. The most preferred gellan gum is KelcoGel F®. Many solid foods utilize gellan gums, for example in pie fillings, jellies, jams, yogurts and the like. As a result of the inventors' endeavors, it has been discovered that superior results can be achieved when a nutritionally complete liquid formula contains mostly, if not solely, gellan gum. If iota-carrageenan is present then the ratio of gellan gum to carrageenan must be greater than or equal to a weight ratio of 1:4.

Representative of the carrageenans useful in this invention is iota-carrageenan which is sold under the name Viscarin® SA-359 by FMC Corporation. Viscarin® SA-359 is a relatively weak gelling carrageenan. Those skilled in this art will appreciate that numerous suppliers can provide the various forms of the gellan gum and carrageenan that are useful in the present invention.

The addition of the gellan gum stabilizer system to the nutritional product can occur at any point when conventional stabilizers have been added, for example, in the protein slurry, the carbohydrate slurry, the fat slurry or at the end of manufacture (just prior to packaging). It has been determined from trial and error, that the preferred place of gellan gum addition is to the carbohydrate/mineral slurry. Medical nutritionals are typically made through the combination of various prepared slurries and premixes. It is important to note that the gellan gum should be fully hydrated in a buffered system (i.e., sodium citrate) prior to any addition of mineral cations, such as calcium. The presence of cations, at relatively low concentrations, for example 0.004% by weight, increases the temperature at which the gellan gum hydrates. Proper hydration of the gellan gum prior to exposure to cations provides for the proper level of yield stress that results in the unique properties of gellan gum in a nutritionally complete liquid formula.

It has been discovered that the utilization of low concentrations of gellan gum in nutritionally complete liquid formulas, results in the formation of a relatively weak three-dimensional network that effectively holds the minerals as well as the fat globules in the nutritional matrix. By holding the minerals in this weak three-dimensional network, the result is reduced sedimentation, creaming and sagging.

The specific concentrations of the gellan gum may range from 10 to 500 parts per million depending upon the specific type, nature of the product matrix and addition of other stabilizers. Certain rheological properties are necessary for a liquid nutritional product. For example, the products possess a yield stress (a stress above which flow begins) such that the yield stress exceeds about 0.1 dyne per sq cm and is preferably below 1.0 dyne per square cm. In comparison, water has a yield stress value of about 0.0. In addition, the gellan gum allows the liquid nutritional to be quite shear thinning, such that it is free flowing at shear rates at which the product is poured or consumed.

EXAMPLE I

Gellan Gum in a Medical Nutritional

Nutrition is an important consideration for the patient with respiratory insufficiency. The incidence of malnutrition is high in patients with chronic respiratory disease and those hospitalized with respiratory failure. Patients on mechanical ventilatory support are often administered medical nutritionals that are directed to the specific needs of a patient with respiratory insufficiency.

Pulmocare® is a nutritional product which is distributed commercially by the Ross Products Division of Abbott Laboratories, Columbus, Ohio. Pulmocare® is a high fat, low carbohydrate enteral formula designed to meet the total dietary needs of pulmonary patients. This medical nutritional may be consumed as a supplement to a regular diet, or more often, tube fed to patients on long term ventilatory support.

To evaluate the effectiveness of the use of gellan gum in accordance with this invention, a Pulmocare® type medical nutritional was prepared with and without a stabilizing system. The base formula was prepared in a manner similar to that described in U.S. Pat. No. 5,223,285, which is incorporated herein by reference, except that no stabilizing system was added. This product serves as the Control in this Example. The Experimental product contained 75 ppm KelcoGel F® gellan gum supplied from the Kelco Division of Merck & Co.

The Control and Experimental were filled into 0.23 kg (8 ounce) glass bottles or metal cans, closed and sterilized in an agitating retort cooker. The Control and Experimental samples after sterilization were placed in quiescent storage for six months.

After the 6 months of storage, the samples were evaluated for sediment, viscosity, bound sediment and unbound sediment. Sedimentation is a phenomenon of product phase separation wherein mineral particles, denatured proteins and the like, which are insoluble, fall to the bottom of the product container and form a layer. As the product ages, the sediment may further settle and pack and progressively become less dispersible.

Upon shaking, the sediment either remains on the bottom of the product container or becomes dislodged and resuspended (sometimes in pieces) depending on the dispersibility of the sediment. Those resuspended sediment particles or flakes may quickly fall out of suspension within a few minutes of quiescent standing. The sediment, which can be redispersed upon shaking but quickly settles again as particles or flakes upon standing, is called the "unbound" sediment. The sediment which remains on the bottom of the product container is called the "bound" sediment. The presence of "bound" and "unbound" sediment is highly undesirable as their presence adversely affects product functionality, organoleptic properties and nutritional quality.

The "bound" and "unbound" sediment tests used to evaluate the present invention, were performed by first pouring the entire shaken sample into a sediment testing container to separate the two types of sediment and then each sediment was visually rated according to rating scales, as described below.

The rating scale for the "bound" sediment was based on the fraction of the bottom of the original product container actually covered by the sediment. A numerical value from 1 to 6 was assigned based on the coverage of the bottom of the container by the bound sediment.

The rating scale for the "unbound" sediment was based on the size and the distribution density of the sediment particles or flakes which resettled to the bottom of the sediment testing container within the first two minutes of quiescent standing after sample transfer. The distribution density of the unbound sediment particles or flakes was also measured. In the rating of the unbound sediment, a numerical value from 1 to 6 was used to indicate the level of the particle distribution density. In addition, a capitalized letter from A to F was used to indicate the size range of the largest unbound sediment particle or flake. Both numerical and alphabetic ratings were used together for the determination of the unbound sediment.

The distribution of bound and unbound sediments in a sample are affected by the degree of shaking the sample receives. Therefore, a machine was used for uniform shaking the samples to obtain reproducible results.

| Rating | Description |
| --- | --- |
| | RATING SCALE FOR BOUND SEDIMENTATION |
| 1 | No sediment is present. |
| 2 | Up to ⅛ of the bottom of the contain is covered with sediment. |
| 3 | More than ⅛ and up to ¼ of the bottom of the container is covered with sediment. |
| 4 | More than ¼ and up to ½ of the bottom of the container is covered with sediment. |
| 5 | The bottom of the container is more than ½, but less than tottally, covered with sediment. |
| 6 | The bottom of the container is totally covered with sediment. |
| | RATING SCALE FOR UNBOUND SEDIMENTATION |
| 1 | No sediment particles or flakes are present. |
| 2 | Less than 2.0 A–C sediment particles or flakes per square centimeter, but not more than six C particles overall, are present. |
| 3 | From 2.0 to 3.9 A–D sediment particles or flakes per square centimeter, but not more than two D particles overall, are present. |
| 4 | From 4.0 to 7.9 A–E sediment particles or flakes per square centimeter, but not more than two E particles overall, are present. |
| 5 | From 8.0 to 12 A–F sediment particles or flakes per square centimeter, but not more than two F particles overall, are present. |
| 6 | More than 12 sediment particles or flakes per square centimeter, or more than two F particles overall, are present; or the container bottom is totally covered by the sediment within the first two minutes of quiescent standing after the sample transfer. |

The size ranges are defined as: A = 0.2–1.0 mm B = 1.1–2.0 mm C = 3.1–4.0 mm D = 4.1–10.0 mm E = 10.1–20.0 mm F > 20.0 mm Samples were mechanically shaken and each container was placed on its side in a horizontal position. The sample container remained in that position until it was opened for the liquid transfer in the next step. The time span between the shaking and the transfer of the sample liquid did not exceed 3.5 minutes.

The container was opened by removing the entire lid and the liquid immediately poured into a suitable sized cylindrical sediment testing container. The emptied original sample container was inverted and placed on a towel, or equivalent, to drain out and absorb any residual fluid to facilitate the subsequent bound sediment rating.

The cylindrical testing container containing the liquid sample was allowed to stand quiescently for a minimum of two minutes after the sample transfer to allow the dislodged and resuspended sediment particles or flakes to fall down to the bottom of the container for the subsequent unbound sediment rating.

The bound sediment which remains adhered to the bottom of the original sample container was then visually rated by estimating the fraction of the sample container bottom actually covered by the bound sediment and the rating number was assigned.

The unbound sediment on the bottom of the cylindrical sediment testing container was rated between two minutes and one hour of quiescent standing after the sample transfer. Through the use of a template to measure area, proper lighting and the sediment testing container, the number of unbound sediment particles or flakes larger than 0.2 mm in size (within a grid of the template) were counted. An average number of particles per grid (or per cm) were calculated and used to determine the unbound sediment rating.

Viscosities were determined on a Brookfield viscometer using a RV #1 spindle at room temperature.

The results of the physical stability investigation conducted at 0 time and 6 months is set forth in Table I.

TABLE I

Physical Stability Results
0 and 6 month data

| Sample | Sediment Liquid+ | | Viscosity Pa · s × 10³ | | Bound Sediment | | Unbound Sediment | |
| --- | --- | --- | --- | --- | --- | --- | --- | --- |
| | 0 M | 6 M | 0 M | 6 M | 0 M | 6 M | 0 M | 6 M |
| Control* | 6 | 5 | 21.4 | 20.6 | 5 | 5 | 1 | 3D |
| Experimental** | 5 | 5 | 34.2 | 22.8 | 4 | 4 | 1 | 1 |
| Pulmocare ®++ | NT | NT | 16.3 | 17.6 | NT | 5 | NT | 3C |

NT = not tested
*no stabilizer
**75 ppm gellan gum
+same test as bound sediment test except that container was not shaken prior to evaluation
++Pulmocare ® type product results are average of 3 production runs, stabilizer system was 40 ppm kappa carrageenan These data demonstrate that even though products may have similar viscosities, sedimentation is considerably less in the product formulated with gellan gum. The Experimental product also evidenced enhanced 6 month stability over the commercial Pulmocare® product for both the bound and unbound sediment. Other stabilizers, such as carrageenan and the like may decrease sedimentation and suspend powder additives somewhat, however they produce unacceptably high viscosities. High viscosities result in unacceptable mouthfeel characteristics and poor flow properties. Thus, it is surprising that gellan gum can produce a positive impact on physical stability with minimal increase in viscosity.

EXAMPLE II

Calcium and Phosphorous Deliveries

As mentioned previously, medical nutritionals are often the sole source of nutrition for patients that are unconscious or unable to consume food orally. These patients typically receive the medical nutritional through a nasogastric tube or a gastrostomy tube. When patients are tube fed, it is also typical that an enteral pump be used to administer the nutritional over a long period of time. Typically, about 1 liter of medical nutritional is administered over a 24 hour period by the pump. If sedimentation occurs during storage and administration of the nutritional, inadequate levels of minerals, (e.g. calcium and phosphorous) will be administered and further clogging of the feeding tube may occur.

In this Experiment, the Control and Experimental products were vigorously shaken using a mechanical shaker and placed in an enteral feeding container to which was connected a feeding tube pump set, an 8 French enteral feeding tube and an enteral feeding pump. The pump was set to deliver 30 cc/hr for a simulated 8 hour feeding. At the end of the 8 hour period, the entire delivered sample from each apparatus was collected and stirred vigorously to disperse any sedimented material. An aliquot of the sample was then analyzed for calcium and phosphorous.

Table II sets forth the results of this Experiment. The fortification levels and the % of fortification recovery for each element is recited. "Fortification level" is the level at which each element is added to the medical nutritional at the time of manufacture. The recovery percentage of fortification represents the percentage of each element's fortification level that is delivered through the feeding tube.

TABLE II

Calcium and Phosphorous Pump Deliveries

| Sample Fortification | | Mineral | Fortification | | 8 hr. Feed mg/L | Recovery-% of mg/L* |
|---|---|---|---|---|---|---|
| 0M | 6M | | | | | |
| Control | | Ca | 1370 | 1037 | 77 | 48 |
| | | P | 1328 | 1030 | 78 | 69 |
| Experimental | | Ca | 1370 | 1302 | 95 | 94 |
| | | P | 1328 | 1223 | 92 | 91 |

*Average result of duplicate trials

These data clearly demonstrate gellan gum's effectiveness in promoting the substantial delivery of calcium and phosphorous over an 8 hour feeding period. Further, this experiment reveals that the Control at 0 time and at 6 months (0 m and 6 m) has substantially reduced delivery of calcium and phosphorous. From previous evaluations of the Pulmocare® product (40 ppm carrageenan) using this same test, the Recovery percentage of Fortification at O M, values ranged from 60 to 69% for calcium (4 trials). At 4 M, the product values for calcium ranged from 28 to 58% and 71 to 89% for phosphorous. In contrast, the use of gellan gum provides good levels of delivery and stability at 0 time and after 6 months of storage. Since the minerals in the Control sample and the commercial product were not being fed, it must be assumed that they are being deposited within the tubes or remain in the container as bound or unbound sediment.

EXAMPLE III

The procedure in Example I was followed except the Control sample had added to it 350 ppm of iota-carrageenan. The results of the initial stability study are set forth in Table III.

TABLE III

Initial Physical Stability Results

| Sample | Sediment Liquid* | Viscosity Pa · s × $10^3$ | Bound Sediment |
|---|---|---|---|
| Control 350 ppm-iota | 3 | 34.8 | 5 |
| Experimental 75 ppm gellan gum | 2 | 32.6 | 2 |

*Same test as bound sediment test except that container was not shaken prior to evaluation This Example amply demonstrates that gellan gum is very effective in controlling sediment without increasing viscosity when compared to the commercially used iota-carrageenan. In addition, the level of the gellan gum added was about 20% of the iota level. Most importantly, the use of gellan gum significantly reduced the amount of bound sediment.

Gellan gum significantly improved bound sediment scores and this is important because bound sediment is typically not dispersible, even when vigorous agitation is applied and therefore, the nutrients (Ca, P) which are trapped on the bottom of the container are not available to the consumer, thereby making the product nutritionally deficient in the absence of a stabilizer.

Further, the gellan gum products did not experience any additional creaming over shelf-life.

EXAMPLE IV

Medical Nutritionals Containing Fiber

The inclusion of dietary fiber in nutritional products has recently gained much favor as the physiological benefits of consuming fiber have become more apparent. The benefits of fiber consumption include reduced diarrhea, enhanced bowel function and improvement in the number of bifido bacteria in the intestines.

One major problem with the inclusion of dietary fiber in a medical nutritional is that many sources of desirable dietary fibers, e.g., soy polysaccharides and others are often insoluble and their inclusion into a liquid nutritional that is already prone to sedimentation and phase separation, only aggravates the problem. Typical medical nutritionals contain dietary fiber, including soy polysaccharides, at levels from about 0.5 to about 5.0% by weight.

The medical nutritional industry is also moving towards disease specific products. An example of a disease specific product is the previously mentioned Pulmocare® Enteral Nutritional for patients with compromised respiratory systems. Another example of a disease specific product is Advera® enteral nutritional for patients infected with human immunodeficiency virus (AIDS). Advera is produced and marketed by the Ross Products Division of Abbott Laboratories, Columbus, Ohio.

This medical nutritional contains a protein system comprising a mixture of hydrolyzed soy protein and intact protein. One problem with the use of hydrolyzed proteins in medical nutritionals relates to product physical stability. As proteins are broken down during hydrolysis, their ability to act as emulsifiers is diminished. Therefore, a product like Advera® has two problems to overcome when it comes to product stability: (1) insoluble dietary fiber; and (2) hydrolyzed proteins.

Further investigation on enteral nutritional containing hydrolyzed protein and intact protein, can be found in U.S. Pat. No. 5,514,655 to DeWille et al. This patent also describes prior art attempts to solve the sedimentation problem. The teachings of U.S. Pat. No. 5,514,655 are incorporated herein by reference.

The process to make Advera® is set forth in U.S. Pat. No. 5,403,826 to Cope et al. The teachings of U.S. Pat. No. 5,403,826 are herein incorporated by reference.

In this experiment, the Control composition was the present Advera® product which contains 50 ppm kappa carrageenan and 300 ppm iota-carrageenan. The Experimental products contain 175, 225, 275 and 350 ppm, KelcoGel F® gellan gum. The Control and Experimental formulas were evaluated for fiber sedimentation, flow rates and calcium and phosphorous deliveries.

Using the procedure set forth in Example II, it was determined that all the Experimental samples delivered at least 125% of the label claim levels for both calcium and phosphorous. The Experimental with 275 ppm gellan gum, performed the best with yields of greater than 150%. The gravity flow rates of the Experimental samples decreased from 562 ml/hr for the 175 ppm to 318 ml/hr for the 350 ppm gellan gum. The gravity flow rate for the Control was 789 ml/hr. As observed for the Pulmocare® product, the weak gel structure of gellan gum functions to stabilize the product and suspend insoluble minerals such as calcium, however it also sometimes slightly increases viscosity and thereby reduces gravity flow rates if used at high levels. Gravity feeding, in general, is not recommended for Advera®; however enteral pump deliveries were very good due to the shear thinning properties of the product containing gellan gum. It was found that the minimal shear applied during pumping was enough to reduce the viscosity and allow proper flow of the product.

It was also determined that calcium and phosphorous recoveries from all of the Experimental samples remained above label claim for a 24 hour pumping trial. Visual inspection of the samples placed in a transparent container revealed that the Control product underwent a distinct phase separation within 1 week. The distinct phase separation becomes quite visible when the insoluble fiber begins to settle. This defect was much more apparent in the Control formula than the Experimentals which contained gellan gum. Acceptable levels of gellan gum in Advera® type products can range from 225 to 275 ppm. Of those tested, the best product was that containing about 275 ppm gellan gum. From this experiment, it was determined that an Advera® type product can be significantly improved through the incorporation of gellan gum. The gellan gum appears to favorably interact with the dietary fiber, such as soy polysaccharide, to greatly increase its suspension in the liquid nutritional. In addition, gellan gum forms a shear-thinning, soft gel that requires only minimal shear to attain acceptable flow properties.

EXAMPLE V

The procedure of Example I was used except that 1% cocoa powder was added to produce a chocolate flavored Pulmocare® type product. Flavoring powders, such as cocoa powder, place an additional burden on the physical stability of medical nutritionals, since these powders are very prone to sedimentation and once fallen from solution, these powders have a tendency to form hard sediments that are not easily redispersed. Typical medical nutritionals contain flavoring powders, including cocoa powder, at levels ranging from about 0.5 to about 5.0% by weight.

The Control product in this experiment contained 40 ppm of kappa carrageenan while the Experimental product contained 75 ppm of gellan gum.

Table IV sets forth the results of the initial physical stability.

TABLE IV

| | Chocolate Pulmocare ® | | |
|---|---|---|---|
| Sample | Liquid Sediment | Viscosity Pa · s × 10³ | Bound Sediment |
| Choc-40 ppm Kappa | 6 | 27.1 | 5 |
| Choc-75 ppm Gellan gum | 5 | 41.1 | 3 |

The calcium and phosphorous deliveries for the Control and the Experimental were about equal with both delivering about 100% of fortification.

This Example indicates that bound and unbound sediment ratings were significantly reduced when gellan gum was used as a stabilizing agent. Gellan gum also provides very acceptable calcium and phosphorous deliveries. The Experimental (75 ppm gellan gum) product also had slightly higher gel scores which are to be expected as the formation of a soft gel structure is essential to the gellan gum's stabilizing effect. No creaming defects were observed over the shelf-life (12 months) of the gellan gum containing product. Based on this study, it can be concluded that chocolate flavored medical nutritionals can be produced which have excellent physical stability and low viscosity (less than 0.05 Pa·s) provided up to about 75 ppm, of gellan gum is used in the formula.

Additional testing was conducted on these samples to determine the yield stress values and the viscosity of each sample with increasing rates of shear. The Experimental product possessed a yield stress of 0.5677 dyne/cm² while the Control product was 0.3981 dyne/cm². The viscosity of the Experimental product was 0.04393 Pa·s at a shear rate of 1.292/sec. Table V sets forth the viscosity of each product at increasing levels of shear.

TABLE V

| Shear Rate-1/sec. | Viscosity of Experimental Pa · s | Viscosity of Control Pa · s |
|---|---|---|
| 1.292 | 0.04393 | — |
| 2.129 | — | 0.0187 |
| 23.31 | 0.03182 | — |
| 38.95 | — | 0.01829 |
| 47.73 | 0.02779 | — |
| 73.65 | — | 0.01777 |
| 77.98 | 0.02579 | — |
| 497.1 | — | 0.01738 |
| 501.1 | 0.02121 | — |
| 1090 | — | 0.01700 |
| 1115 | 0.01958 | — |
| 1486 | — | 0.01689 |
| 1490 | 0.01955 | — |

This data demonstrates the shear-thinning properties of a nutritional formula using the invention as described herein. It is interesting to note that the product according to this invention has a high initial viscosity that rapidly drops upon the application of shear. It is, in part, this unique property of gellan gum that allows the present invention to fulfill a long felt need in the medical nutritional industry and thus advance the state of the art in the field of medical nutritionals. In addition, the shear-thinning aspect of the present invention enhances mouthfeel of the nutritional product and facilitates tube feeding.

The data also demonstrate that evaluation of a product based on Brookfield viscosity at a shear rate of 13 reciprocal seconds can be misleading, because under actual conditions of use, such as tube feeding or pouring, the viscosity of a shear thinning product may be appreciably lower. The viscosity during pouring (100 reciprocal seconds) or during tube feeding, is actually a more important physical feature of product performance.

EXAMPLE VI

Ensure® is produced and marketed by the Ross Products Division of Abbott Laboratories, Columbus, Ohio. As mentioned previously, the use of cocoa powder in nutritionally complete liquid formulas only aggravates the problems of physical stability. Also, as noted previously, the presence of fiber in these compositions further aggravates the formation of bound and unbound sediment in these formulations.

In this experiment, two batches of chocolate Ensure® were prepared. The Control contained 350 ppm Viscarin® SA-359 (iota-carrageenan) from FMC of Philadelphia, Pa. The Experimental product contained 75 ppm of gellan gum (KelcoGel F®). The samples were packaged into 802 (ml) glass bottles and then terminally sterilized. Shelf life testing was conducted at 3, 6, 9 and 12 months.

Both samples contained about 21% solids by weight, about 3.5% to 3.6% fat by weight and 3.7% to 3.8% protein by weight.

The testing for bound and unbound sediment was conducted as described in Example I. The data from the physical stability testing is set forth in Table VI.

TABLE VI

Physical Stability of Chocolate Ensure ® Through 12 Months

|  | Bound Sediment | | | | Unbound Sediment | | | |
| --- | --- | --- | --- | --- | --- | --- | --- | --- |
| Sample | 3 M | 6 M | 9 M | 12 M | 3 M | 6 M | 9 M | 12 M |
| Iota-carrageen-an 350 ppm Control | 4 | 2 | 5 | 5 | 6E | 1* | 6D | 6D |
| Experimental 75 ppm Gellan Gum | 4 | 2 | 5 | 5 | 1 | 1 | 1 | 3B |

*Unusual rating may be due to bottle to bottle variability and/or evaluator inexperience This data clearly indicates that gellan gum at almost one fifth the concentration of the commercially accepted carrageenan provides outstanding reduction in the formation of unbound sediment. The 3B rating of the Experimental at 12 months of storage may be due to bottle to bottle variability and/or evaluator variability. In any event, the 3B rating for the gellan gum sample was twice as good as the Control. The 3 vs. 6 rating means that the gellan gum sample had one half the number of flakes or particles of the Control, while the B vs. D ratings means that the gellan gum particles were one half the size of the Control particles. Further, from the 3 month data, the Experimental product with gellan gum exhibited no particles or flakes (unbound sediment score of 1) after two minutes of quiescent standing, while the carrageenan Control received a rating of 6E (10.1 to 20.0 mm sediment particle or flake size)

EXAMPLE VII

In this experiment, the use of gellan gum alone was compared to gellan gum in combination with other commercially available stabilizers and to the use of a commercially available stabilizer alone. The base formulation was vanilla Ensure® with fiber which contains 3.8 g of a dietary fiber blend per 237 ml of product. The fiber blend was 24.2% oat fiber and 75.8% by weight soy polysaccharide. The Control sample contained no stabilizer system, while Experimental VIIA to VIIE contained various stabilizers as shown in Table VII.

The Control and Experimentals were prepared and aseptically packaged into 237 ml plastic containers. Information concerning aseptic processing and packaging can be found in U.S. Pat. No. 5,303,325 to Pasternak et al. The teachings of U.S. Pat. No. 5,303,325 are incorporated herein by reference. The samples were stored for six months and then evaluated for physical stability as set forth in Example I. The results of the 6 month stability study are set forth in Table VII.

TABLE VII

6 Month Stability Data of Ensure ® with Fiber, Aseptic Process

| Sample | Bound Sediment | Unbound Sediment |
| --- | --- | --- |
| Control 0 ppm stabilizer | 6/4.0* | 1 |
| Experimental VII A 50 ppm gellan gum | 5/1.0* | 1 |
| Experimental VII B 100 ppm gellan gum | 5 | 1 |
| Experimental VII C | 5 | 1 |
| 50 ppm gellan gum 1000 ppm Avicel ® Experimental VII D | 5 | 1 |
| 50 ppm gellan gum 1000 ppm Avicel ® 200 ppm iota-carrageenan Experimental VII E | 5 | 1 |
| 50 ppm gellan gum 1500 ppm Avicel Experimental VII F | 6/2.0* | 4D |
| 500 ppm Recodan ® | | |

*depth of sediment in mm
+Avicel ® Cellulose Gel is a microcrystalline cellulose sold by FMC, Inc.
++Recodan ®CM is an emulsifier/stabilizer sold by Grinsted Products of Kansas.
Recodan ® is a mixture of mono-and di-glycerides, carrageenan and guar gum which is promoted as being useful in cocoa containing products where the separation of the fat and cocoa content of the product is avoided.

From this experiment, it is evident that gellan gum alone or in combination with other conventional stabilizers provides acceptable stability to nutritionally complete, aseptically filled liquid formulas. In fact, gellan gum alone at about 100 ppm provides better stability to the nutritional than 500 ppm of a conventional stabilizer that is recommended for this type of product (Recodan®). This surprising result means that cost savings in raw materials and processing can be realized through the use of gellan gum alone. Further, gellan gum avoids the medical and regulatory problems reported with carrageenans and microcrystalline cellulose.

EXAMPLE VIII

Addition of Gellan Gum

In this experiment, the point of addition of the gellan gum during the manufacture of the nutritionally complete liquid formula was investigated. Numerous experiments, as set forth below, were conducted on a laboratory scale using KelcoGel F® as the gellan gum.

Initially, the gellan gum was added to hot (180° F.) water containing citric acid, pH of 2.20. The gum powder dispersed into the solution but did not go into solution. KOH was added to the dispersion to arrive at a pH of about 12.0. At a pH of about 12.0, the gellan gum was fully dissolved.

In the next experiment, 2 gms of the powdered gum was added to about 400 gms of hot (190° F.) corn oil. Under mild agitation, the gum dispersed, but did not go into solution (hydrate).

The next test consisted of adding gellan gum to hot (about 185° F.) water at a pH of 7.0. About 2 gms of the gum was added under mild agitation, it failed to disperse and formed "fish eyes". Fish eyes are the gellan gum particles that bind together (form clumps) to form a ball of gel that appears in the dispersion to resemble the eye of a fish. Decreasing the pH of the dispersion to 3.0 and increasing the pH to about 12 did not result in the gum going into solution.

The next experiment added gellan gum to cold water and the dispersion was then heated to 175° to 185° F. The gum dispersed readily and no clumping or fisheye formation was observed. 2.02 gms of sodium citrate was then added and the solution became clear, indicating that the gellan gum had gone into solution (become hydrated).

This experiment revealed that the gellan gum can be added to cold water without the formation of clumps and that a sequesterant such as sodium citrate allows for the gum to become soluble or hydrated.

This experiment formed a solution of tri-calcium phosphate in hot water. The gellan gum was then added under mild agitation. The gum did not disperse as it formed fish eyes. This method of incorporation would not be acceptable for commercial production.

In this experiment, gellan gum was dry blended with sucrose at 1:100 and 1:10 ratios (4 g gellan gum:40 g sucrose and 0.4 g gellan gum:4 g sucrose) and added to hot water. The dispersions formed readily and upon the addition of 2.02 g of sodium citrate, the gellan gum went into solution. A 1:20 ratio was found to be the most preferred.

From the results of these observations, it was concluded that in commercial product, the process for the incorporation of gellan gum into a nutritionally complete liquid formula would comprise: (a) the formation of a dispersion of (i) gellan gum in water; or (ii) gellan gum and a sugar, such as sucrose, in water; (b) admixing a sequesterant to the dispersion formed in step (a) to form a solution; and (c) admixing additional components to form a nutritionally complete liquid formula. In a preferred embodiment, the gellan gum is dry blended at a weight ratio of 1:20 to 1:10 with sucrose prior to addition to hot water to form a dispersion. The gellan gum/sucrose dispersion then has a sequesterant, such as sodium citrate, added to it prior to proceeding with the addition of additional components. Essentially complete hydration of the gellan gum is required to realize the full benefit of this stabilizer in a nutritionally complete formula.

INDUSTRIAL APPLICABILITY

The data demonstrate that the liquid nutritional prepared in accordance with this invention possesses improved physical stability with respect to creaming and sedimentation. The problems encountered by the medical and infant nutritional industry in preparing products that exhibit good shelf-life (product stability) are unique. Due to the high loadings of solids (e.g., minerals, vitamins, flavors and fiber) found in these products and the high viscosities, the nutritional industry, until now, has failed to provide a low viscosity solution to this long felt need. Through the discovery disclosed in this invention, the nutritional industry can prepare and supply liquid nutritional products that do not suffer from the problem of sedimentation. More specifically, it has been determined that gellan gum promotes the delivery of sufficient insoluble nutrients (e.g. minerals) as measured by delivery of calcium and phosphorous with acceptable viscosity, good flow characteristics and reduced sedimentation. It has also been demonstrated that gellan gum prevents flavoring powders, such as cocoa, from compacting and improves the suspension properties of insoluble fibers. This is especially important in that distinct phase separation can create a perception of a spoiled product while creaming can impact on the correct delivery of nutrients such as protein and lipid. In addition, the weak gel structure of gellan gums breaks down easily under low shear conditions allowing for convenient consumption. Further, gellan gums are readily available and have no adverse physiological effect.

An important advantage of the use of gellan gums in nutritionally complete formulas is a reduction in the over fortification of the formula with calcium and phosphorous to allow for the delivery of these minerals to meet required daily intakes and/or label claims. As the nutritionally complete formulas can have reduced levels of over fortification, an economic benefit can be realized.

While the liquid nutritional herein described and the method of making same constitute preferred embodiments of the invention, it is to be understood that the invention is not limited to this precise formulation and that changes may be made therein without departing from the scope of the invention which is defined in the appended claims.

We claim:

1. A nutritionally complete liquid composition comprising:
    a) a caloric content of from about 500 calories to about 2,000 calories per liter and containing suspended minerals, vitamins, proteins, carbohydrates and fats sufficient to allow said composition to be the sole source of nutrition for a human;
    b) a total solids content, including said suspended minerals, in the range of from about 10% to about 35% by weight, and;
    c) a stabilizing system consisting essentially of gellan gum, present in said composition at a concentration in the range of about 10 to about 500 parts per million.

2. The composition according to claim 1 wherein said concentration of said gellan gum is in the range of about 20 to 400 parts per million.

3. The composition according to claim 1 wherein said concentration of said gellan gum is in the range of about 50 to about 100 parts per million.

4. The composition according to claim 1 wherein said composition has a caloric distribution of about 10 to 20% protein, about 25 to 40% fat and about 40 to 60% carbohydrate.

5. The composition according to claim 1, in which said total solids content is in the range of from about 15% to about 25% by weight.

6. The composition according to claim 1, which further contains coca powder, present in a concentration ranging from about 0.5% to about 5% by weight.

7. The composition according to claim 1, in which said total solids content is in the range of from about 15% to about 35% by weight.

8. The composition according to claim 7, which further contains dietary fibers, present in a concentration ranging from about 0.5% to about 5% by weight.

9. A nutritionally complete liquid composition containing vitamins, proteins, carbohydrates, fats, and suspended minerals sufficient to allow said composition to be the sole source of nutrition for a human, said liquid composition comprising:
    a) a total solids content, including said suspended minerals, in the range of from about 15% to about 25% by weight, and;
    b) a stabilizing system consisting essentially of gellan gum, present in said composition at a concentration in the range of about 10 to about 500 parts per million.

10. A method of preparing a nutritionally complete liquid composition, said method comprising the steps of:
    a) preparing a mixture comprising:
        i) a nutritionally complete liquid mixture containing suspended minerals, vitamins, proteins, carbohydrates and fats sufficient to allow said composition to be the sole source of nutrition for a human and wherein said mixture contains total solids, including said suspended minerals, in the range from about 10% to about 35% by weight; and
        ii) gellan gum present in said liquid nutritional composition at a concentration in the range of about 10 to 500 parts per million;

b) subjecting said composition resulting from step a) to aseptic processing conditions; followed by c) aseptically packaging said composition, wherein said composition is essentially devoid of sedimentation.

11. A method according to claim 10 wherein said composition further comprises carrageenan.

12. A nutritionally complete liquid formula containing vitamins, proteins, carbohydrates, fats, and suspended minerals sufficient to allow said formula to be the sole source of nutrition for a human and having a total solids content in the range of from about 10% to about 35%, including said suspended minerals, with improved physical stability, said liquid formula containing a stabilizing system, said system comprising gellan gum at a concentration between 10 and 500 parts per million, said concentration being low enough for said liquid formulas to possess an actual yield stress value of about 0.1 to about 1.0 dyne per square centimeter, yet said concentration being high enough to hold said minerals, fibers and flavoring agents in suspension with minimum sedimentation.

13. The nutritionally complete liquid formula according to claim 12 wherein said total solids content is in the range of from about 15% to about 25% by weight.

14. The nutritionally complete liquid formula according to claim 13 wherein said stabilizing system further comprises a member selected from the group consisting of carboxymethylcellulose and carrageenan, and wherein the concentration of said gellan gum is less than about 5% by wt. of said stabilizing system.

15. A liquid, nutritionally complete food containing vitamins, proteins, carbohydrates, fats, and suspended minerals sufficient to allow said food to be the sole source of nutrition for a human and having a total solids content in the range of from about 10% to about 35% by weight, including said suspended minerals, with reduced sedimentation, said liquid food comprising gellan gum and carrageenan in a weight ratio of gellan gum to carrageenan of at least 1:4, said gellan gum being of a concentration between about 10 and about 500 parts per million and said liquid food having a viscosity of less than 0.05 Pa·s.

16. The nutritionally complete food according to claim 15 wherein the concentration of said gellan gum is between about 50 and about 100 ppm, the weight ratio of gellan gum to carrageenan is at least 1:5 and the viscosity of said formula is less than 0.04 Pa·s.

17. A nutritionally complete liquid formula containing vitamins, proteins, carbohydrates, fats, and suspended minerals sufficient to allow said formula to be the sole source of nutrition for a human, said liquid formula comprising:

a) a protein system consisting of, by weight, about 50 to 90% of a protein hydrolysate and not more than about 50% of one or more intact proteins;

b) a fat source;

c) a carbohydrate system;

d) a stabilizer system comprising gellan gum at a concentration of from 175 to 350 ppm, and;

e) vitamins and suspended minerals, wherein total solids content including said suspended minerals is in the range of about 15% to about 35%.

18. The formula according to claim 17 wherein the stabilizer system consists essentially of gellan gum at a concentration of 225 to 275 ppm.

19. The formula according to claim 17 wherein said protein hydrolysate is selected from the group consisting of soy hydrolysates, milk protein hydrolysates and mixtures thereof.

20. The formula according to claim 19 wherein said fat source is selected from the group consisting of canola oil, medium chain triglycerides, marine oils, vegetable oils and mixtures thereof.

21. The formula according to claim 19 wherein the carbohydrate system is selected from the group consisting of starch, maltodextrin, sucrose, soy polysaccharide and mixtures thereof.

* * * * *